United States Patent
Yamada et al.

[11] Patent Number: 5,974,675
[45] Date of Patent: Nov. 2, 1999

[54] NAVIGATION UNIT

[75] Inventors: Kunihiro Yamada; Akihiro Shinato, both of Anjo, Japan

[73] Assignee: Aisin Aw Co., Ltd., Japan

[21] Appl. No.: 08/775,494

[22] Filed: Dec. 31, 1996

[30] Foreign Application Priority Data

May 31, 1996 [JP] Japan .................................. 8-139270

[51] Int. Cl.⁶ ................................................. G01C 19/00
[52] U.S. Cl. .............................. 33/318; 33/324; 33/329; 74/5.22; 74/5.8; 248/207; 248/223.41
[58] Field of Search ........................... 33/318, 319, 320, 33/321, 322, 323, 324, 328, 329, 347; 74/5 R, 5.22, 5.9, 5.8; 248/207, 223.41

[56] References Cited

U.S. PATENT DOCUMENTS

| | | | |
|---|---|---|---|
| 1,067,716 | 7/1913 | Burdett | 33/320 |
| 1,137,258 | 4/1915 | Chessin | 33/320 |
| 2,099,705 | 11/1937 | Reichel | 33/318 |
| 2,219,964 | 10/1940 | Roland et al. | 33/318 |
| 3,313,163 | 4/1967 | Flannelly | 74/5.22 |
| 3,610,054 | 10/1971 | Johnston | 74/5 R |
| 4,756,088 | 7/1988 | Russell et al. | 33/318 |
| 5,816,097 | 10/1998 | Park | 74/5 R |

*Primary Examiner*—Andrew Hirshfeld
*Attorney, Agent, or Firm*—Lorusso & Loud

[57] ABSTRACT

A navigation unit having a gyro sensor mounted thereon. The unit includes a mounting mechanism for changing the mounting direction of the gyro sensor so that the rotation detecting axis of the gyro sensor may be vertical, i.e. normal to a vehicle. In one embodiment, the navigation unit includes a support device for supporting the gyro sensor rotatably with respect to a casing. The gyro sensor may be supported in a rocking manner in the casing, and mounted to be changed between a first mounting direction and a second mounting direction perpendicular to the first mounting direction. In the preferred construction, the gyro sensor has a first pin and a second pin, and the casing has a first guide groove for receiving and guiding the first pin, and a second guide groove extending perpendicular to the first guide groove for receiving and guiding the second pin. The second guide groove provides a rocking center for the gyro sensor.

3 Claims, 8 Drawing Sheets

NAVIGATION UNIT

BACKGROUND OF THE INVENTION

1. Field of the Invention

The present invention relates to a navigation unit, and, more particularly, to a navigation unit having a selectively positionable gyro sensor mounted therein.

2. Related Art

Navigation systems for use in vehicles are conventionally constructed to include: a display device having a display for displaying data; a control unit allowing a driver to input data; a receiver for using a variety of media; a CD-ROM driver for using a CD-ROM; and a navigation unit for supervising the entirety of the navigation system. The navigation unit includes a variety of electronic parts such as a CPU, a memory and an interface, a card holder for holding a feature expansion PC card, and a gyro sensor for detecting the direction of travel of the vehicle. The navigation unit is usually mounted in a trunk of the vehicle, and is connected with the receiver and the CD-ROM driver, also mounted in the trunk, and with the display device mounted in the passenger compartment near the driver's seat.

Conventional navigation units, however, have such a large size and occupy so much space that they are difficult to mount on a vehicle. In order to improve the mountability, therefore, attempts have been made to provide a navigation unit which can be installed either horizontally or vertically on the vehicle. However, since the gyro sensor must have its rotation detecting axis vertical at all times, it cannot be used in a navigation unit which can be installed either horizontally or vertically. Thus, in these navigation units the gyro unit having the gyro sensor is made separate from the remainder of the navigation unit so that the gyro unit is installed directly on the vehicle. In this latter case, however, the total space occupied by the navigation unit and the gyro unit is enlarged. In addition, the work for installing the gyro unit directly on the vehicle is troublesome, and communication circuits or the like are required between the navigation unit and the gyro unit, thus raising cost.

Navigation units have also been constructed for horizontal installation with two gyro sensors, having different mounting directions, mounted therein. In this construction, when one gyro sensor is mounted vertically in the navigation unit, the other gyro sensor can also be used. However, the two gyro sensors must be mounted in advance in the navigation unit, thus increasing cost and occupied area.

SUMMARY OF THE INVENTION

Thus an object of the present invention is to solve the aforementioned problems of the navigation units of the prior art by providing a navigation unit which has its gyro sensor oriented in a vertical direction, regardless of the orientation of the navigation unit as installed.

Another object of the present invention is to provide a navigation unit which is of a lower cost and reduced size compared to that of the prior art.

These and other objects of the present invention will become apparent from a review of the description provided below.

The navigation unit of the present invention has a gyro sensor mounted thereon. A mounting mechanism is provided for changing the mounting orientation of the gyro sensor so that the rotation detecting axis of the gyro sensor is in a vertical direction, normal to the vehicle.

In one embodiment, the navigation unit further has: support means for supporting a gyro sensor rotatably with respect to a casing; and mounting means for fixing the gyro sensor, as placed in a predetermined mounting direction, so that the rotation detecting axis of the gyro sensor is fixed in the vertical. The gyro sensor may be supported in a rocking manner in the casing, allowing it to be mounted in a first mounting direction or in a second mounting direction perpendicular to the first mounting direction. In this construction, the gyro sensor has a first pin and a second pin, and the casing has a first guide groove for receiving and guiding the first pin, and a second guide groove extending perpendicular to the first guide groove for receiving and guiding the second pin. The second guide groove provides a rocking center for the gyro sensor at its end portion.

BRIEF DESCRIPTION OF THE DRAWINGS

A preferred embodiment of the invention is described below with reference to the following figures wherein like numerals represent like parts.

DESCRIPTION OF THE PREFERRED EMBODIMENT

The present invention will now be described in detail with reference to the accompanying drawings.

Figure 3:
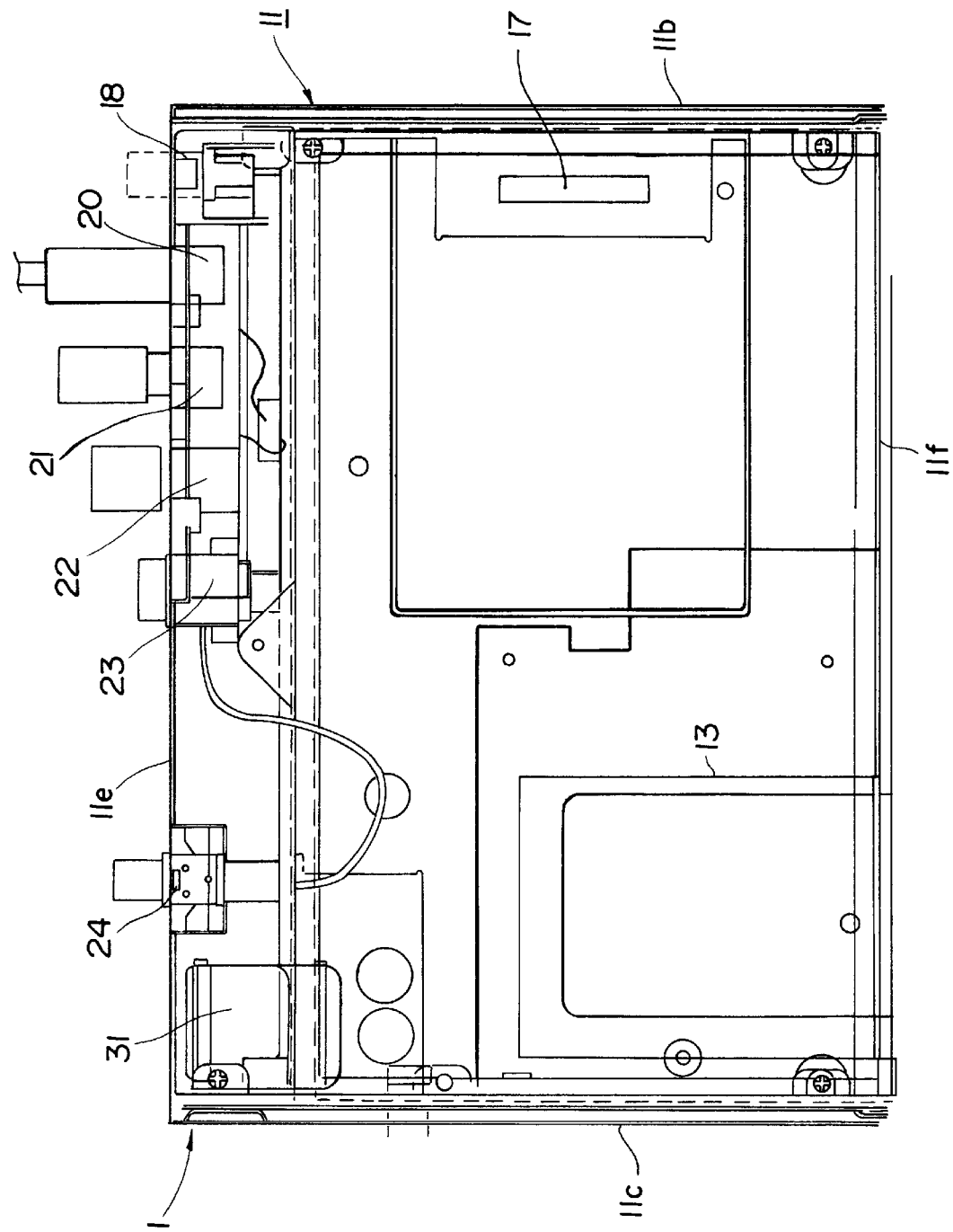
FIG. 3 is a perspective top plan view of a navigation unit according to the present invention.
Figure 4:
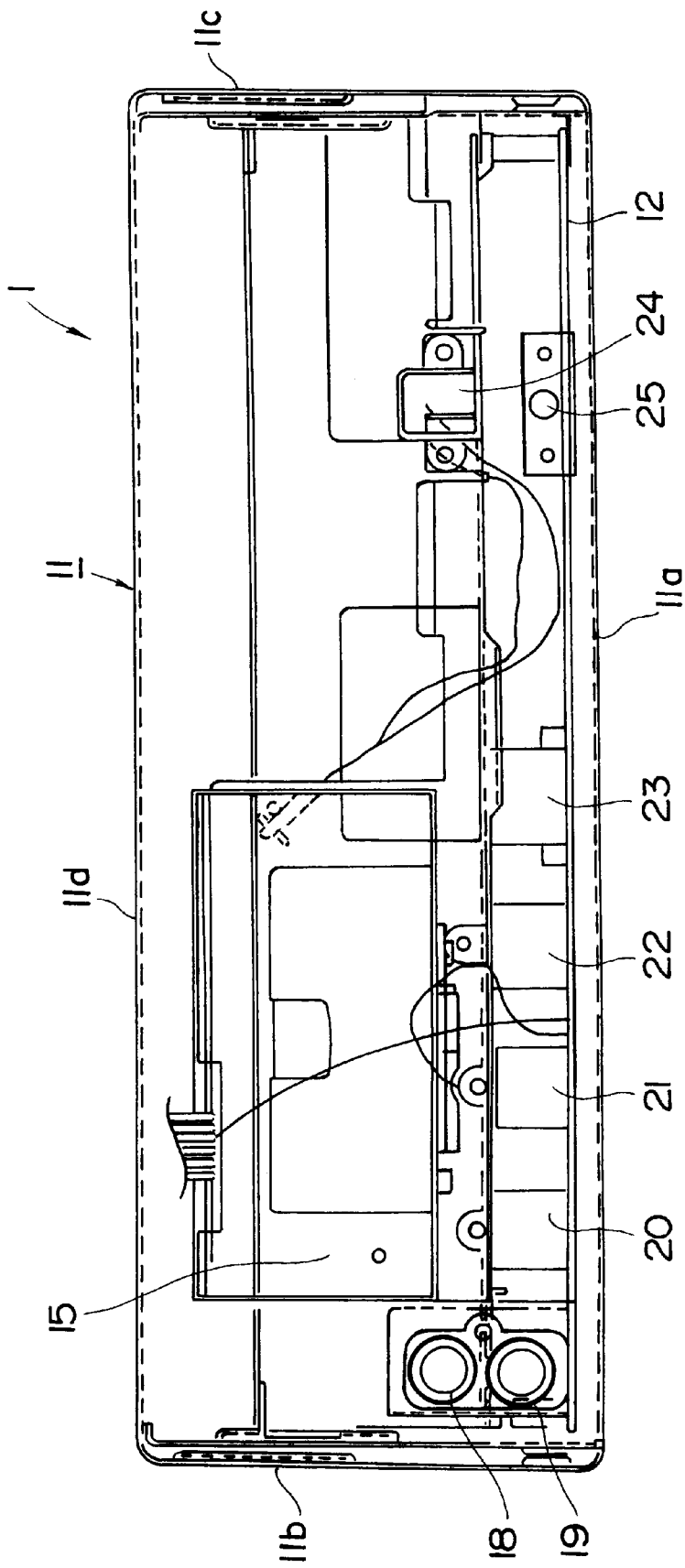
FIG. 4 is a perspective back elevation of a navigation unit according to the present invention.

With reference to FIGS. 3 and 4, the navigation unit 1 of the present invention includes a casing 11 composed of a bottom wall 11a, side walls 11b and 11c, a top wall 11d, a back wall 11e and a front wall 11f. A PC board 12 is arranged parallel to bottom wall 11a of the casing 11. The PC board 12 is equipped with a card holder 13 for holding a feature expansion PC card (not shown) and a variety of electronic parts such as a CPU, a memory or an interface (not shown).

The navigation unit further includes: a GPS 15 for detecting the present location of the vehicle; a connector 17 for a flexible cable; pin jacks 18, 19; an RGB 20 output; a feature expansion connector 21; a connector 22 for a communications system; a connector 23 for a vehicular power source; an antenna connector 24; a connector 25 for a remote control eye; and a gyro sensor 31 for detecting the direction of travel of the vehicle. The navigation unit thus constructed has a large size and occupies considerable space, making mounting of the unit difficult. In order to improve mountability, the navigation unit is designed so that it can be installed with its base 11f either horizontal or vertical.

Specifically, when the navigation unit is to be installed horizontally, the bottom wall 11a is positioned facing (parallel to) the floor of the vehicle. When the navigation unit is to be installed vertically, the back wall 11e is positioned parallel to the floor. For vertical installation, a predetermined gap is left between the back wall 11e and the floor of the vehicle to accommodate the connectors 21, 22, 23, 24 and 25 which protrude from the back wall 11e. The mounting direction of the gyro sensor 31 can also be changed by 90° to accommodate both horizontal and vertical installation.

Figure 5:
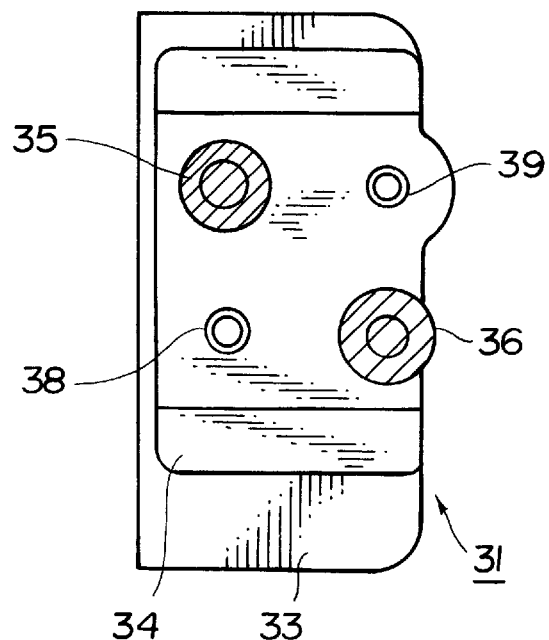
FIG. 5 is a front elevation of a gyro sensor according to the present invention.
Figure 6:
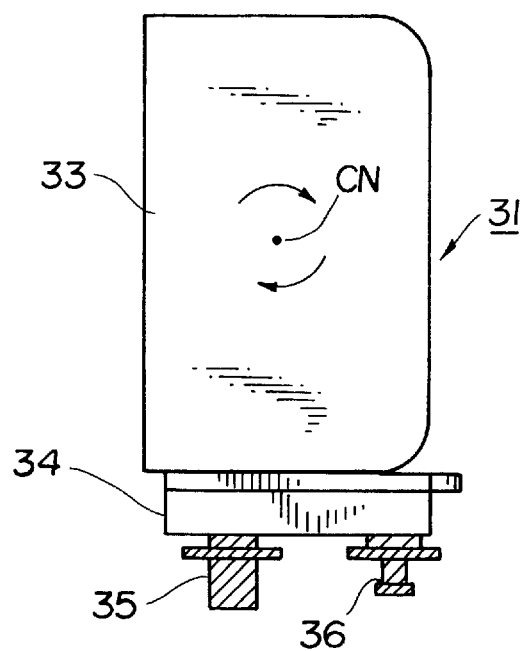
FIG. 6 is a top plan view of the gyro sensor of FIG. 5.
Figure 7:
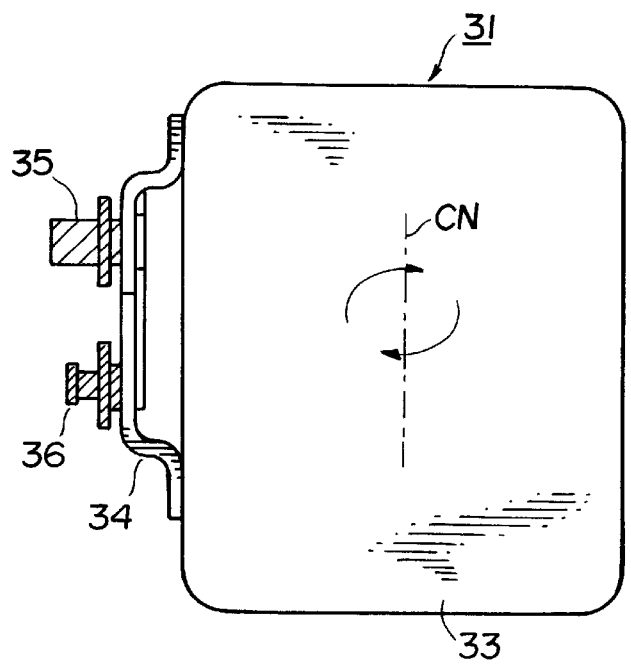
FIG. 7 is a side elevation of the gyro sensor of FIG. 5.

As shown in FIGS. 5 to 7, the gyro sensor 31 is equipped with a body 33 and a bracket 34 fixed on one face (i.e. the front face) of the body 33. To the bracket 34, there are attached a first pin 35 acting as a knob for changing the mounting direction of the gyro sensor 31, and a second pin 36 arranged orthogonally of the first pin 35. Also, threaded holes 38 and 39 for fixing the gyro sensor 31 in one of the individual mounting positions are formed on an orthogonal line of the bracket 34. As shown in FIGS. 6 and 7, reference letters CN designate the rotation detecting axis of the gyro sensor 31.

Figure 8:
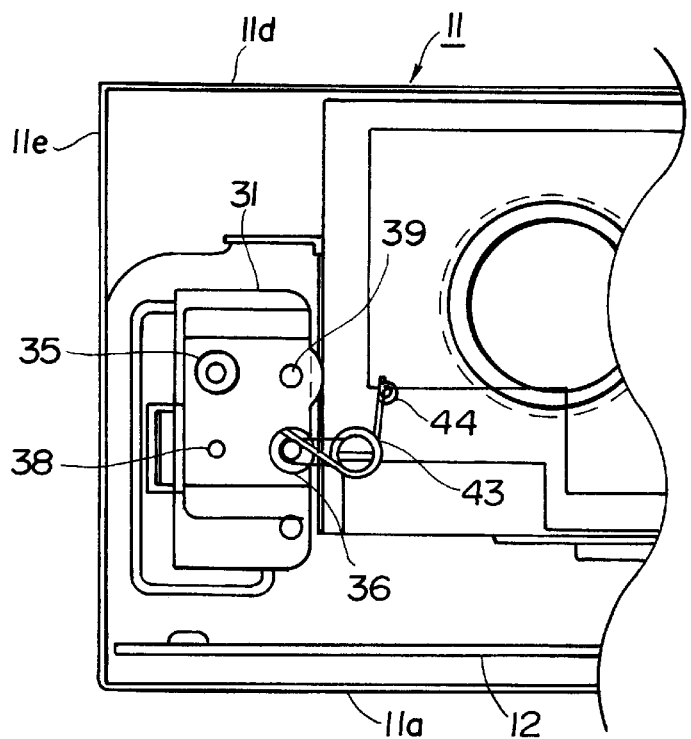
FIG. 8 is a lefthand side elevation of the navigation unit according to the present invention, when installed horizontally.
Figure 9:
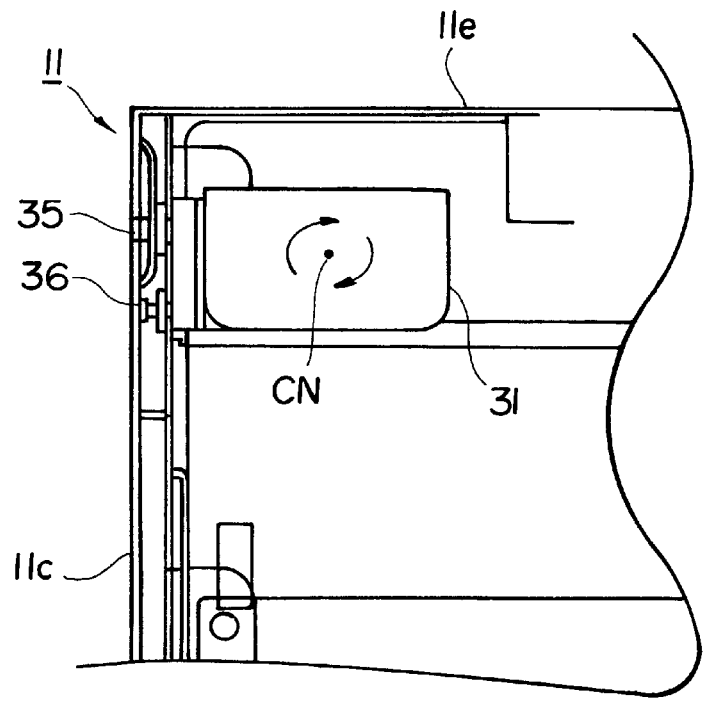
FIG. 9 is a top plan view of the navigation unit of FIG. 8.
Figure 10:
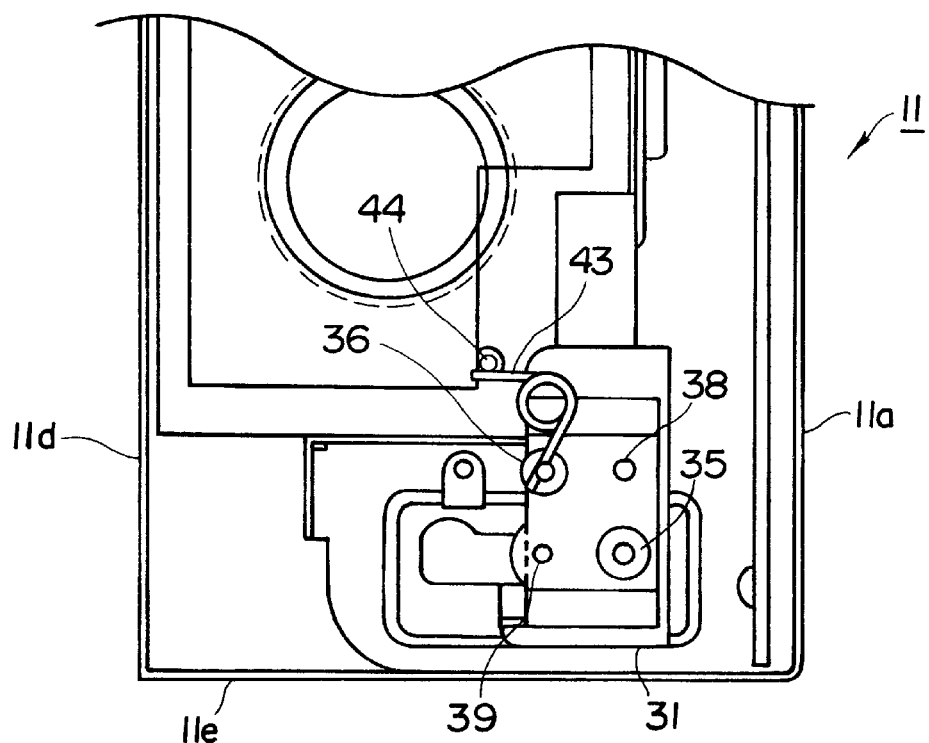
FIG. 10 is a lefthand side elevation of the navigation unit according to the present invention, when installed horizontally.
Figure 11:
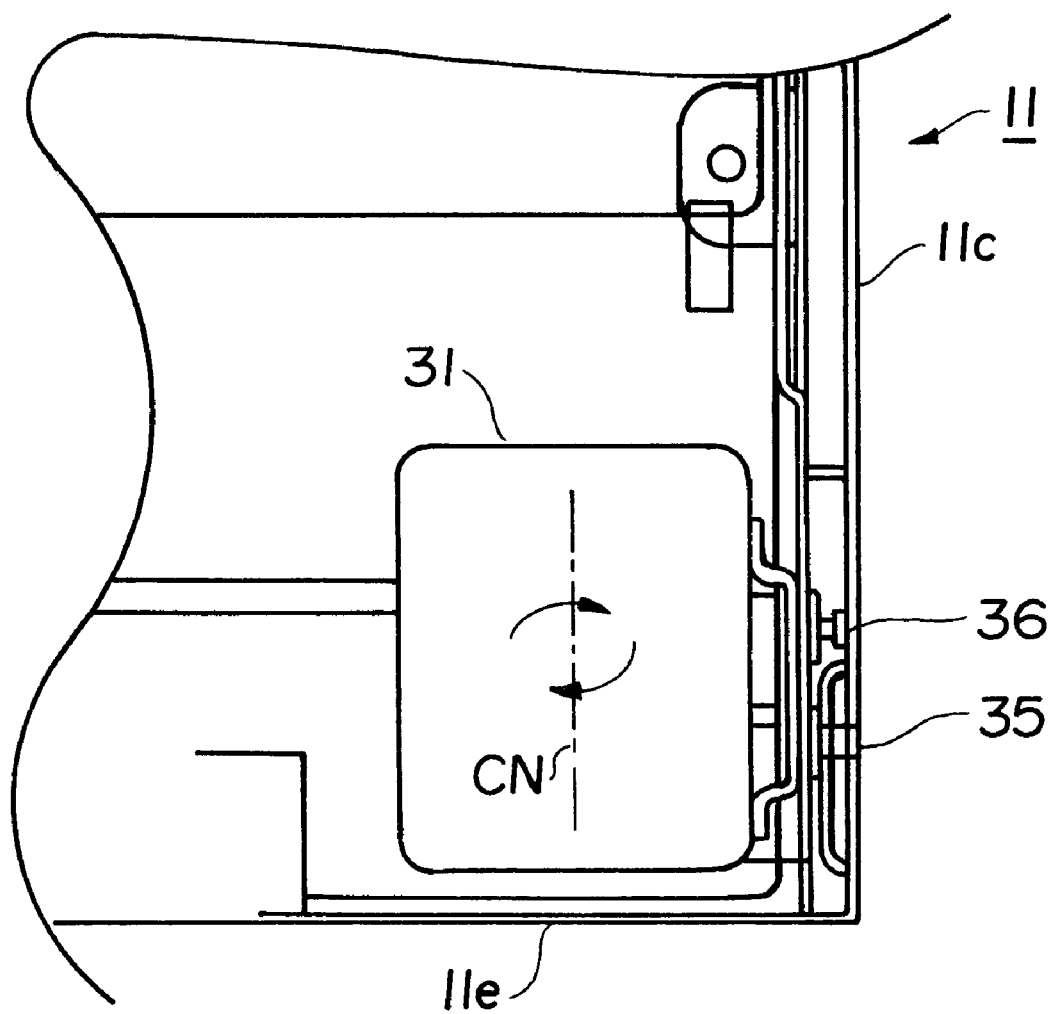
FIG. 11 is a back elevation of the navigation unit of FIG. 10.

With reference now to FIGS. 8 to 11, a spring 43 is fixed between the second pin 36 and a retaining member 44 to urge the second pin 36 in a predetermined direction. This spring 43 gives a click feel to the operator when the mounting direction of the gyro sensor 31 is changed. Moreover, the gyro sensor 31 is supported to rock in the casing 11, and its mounting may be changed between a first mounting direction, as shown in FIGS. 8 and 9, and a second mounting direction perpendicular to the first, as shown in FIGS. 10 and 11.

Specifically, when the navigation unit is to be installed horizontally, as shown in FIGS. 8 and 9, the top wall 11d is placed uppermost with the bottom wall 11a in a lower position. By arranging the first pin 35 and the second pin 36 at the side of the upper top wall 11d and at the side of the lower bottom wall 11a, respectively, the gyro sensor 31 is mounted in the first mounting direction so that the rotation detecting axis CN of the gyro sensor 31 is positioned vertically.

When the navigation unit is to be installed vertically, as shown in FIGS. 10 and 11, the front wall 11f (as shown in FIG. 3) is placed uppermost with the back wall 11e in a lower position. By arranging the second pin 36 at the side of the upper front wall 11f and the first pin 35 at the side of the lower back wall 11e, the gyro sensor is mounted in the second mounting direction so that the rotation detecting axis CN of the gyro sensor 31 is positioned vertically.

Figure 1:
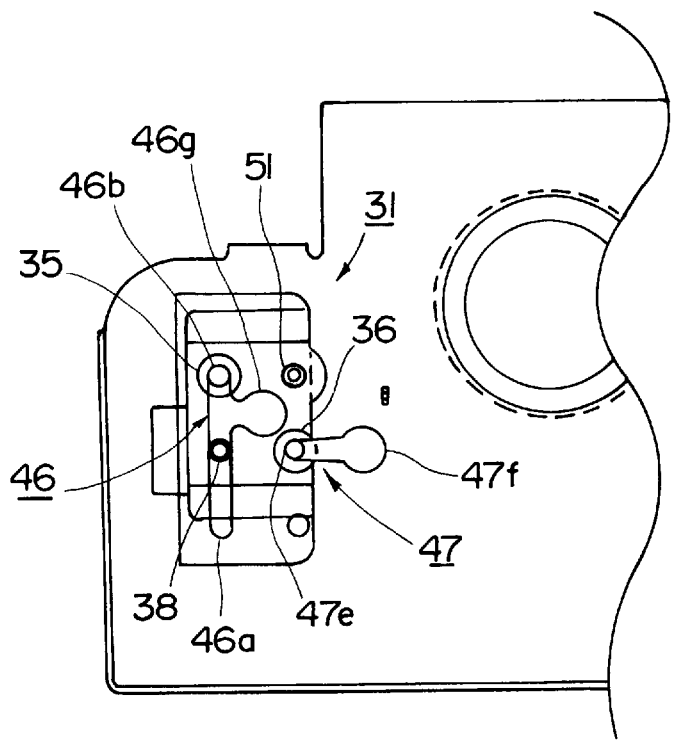
FIG. 1 is an end view of a navigation unit according to the present invention showing a first support state of the gyro sensor.
Figure 2:
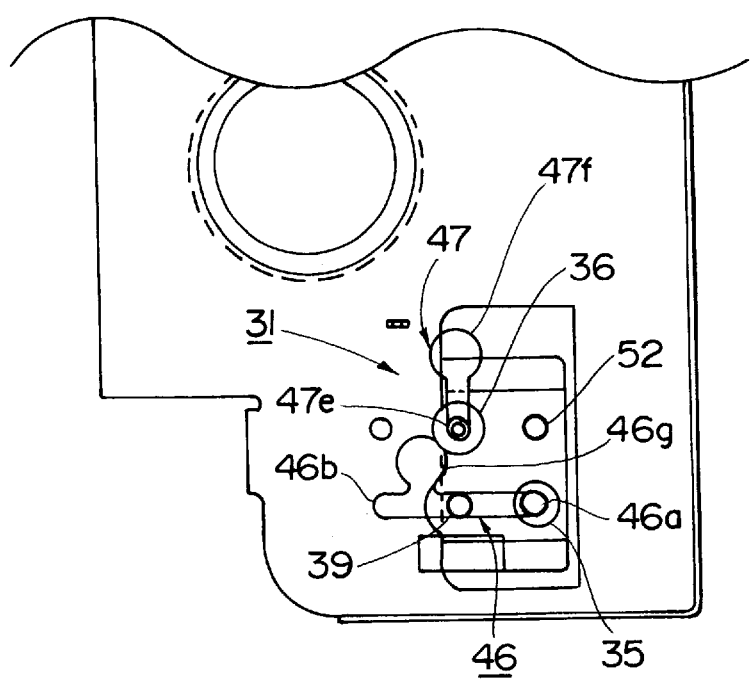
FIG. 2 is an end view of a navigation unit according to the present invention showing a second support state of the gyro sensor.
Figure 12:
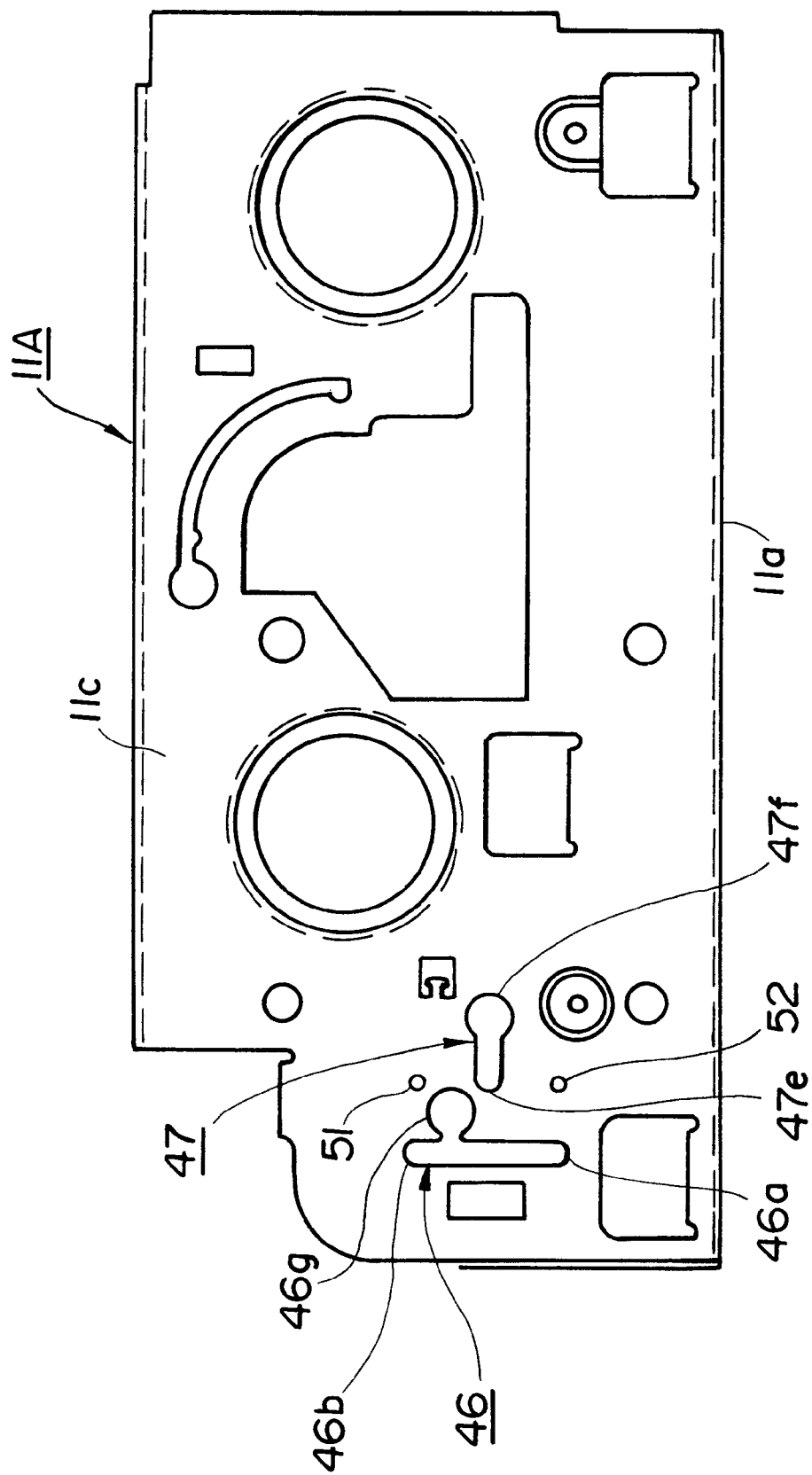
FIG. 12 is a side elevation of a lower case unit of the casing according to the present invention.

A support device acting as a mounting mechanism for supporting the gyro sensor 31 in a manner to rotate, i.e., rock with respect to the casing 11, is shown in FIGS. 1, 2, and 12. In these figures, reference numeral 11A designates a lower case unit, which is combined with an upper case unit (not shown) to make the casing 11, as shown in FIG. 11. In a predetermined portion of the side wall 11c at the side of the back wall 11e, there are formed a first guide groove 46 extending in parallel with the back wall 11e, and a second guide groove 47 extending in parallel with the bottom wall 11a and perpendicular to the first guide groove 46. The first pin 35 and the second pin 36 are guided by the first guide groove 46 and the second guide groove 47, respectively. The first pin 35, the second pin 36, the first guide groove 46 and the second guide groove 47, thus oriented, constitute the support device.

The first guide groove 46 extends between its end portion 46a at the side of the bottom wall 11a and its end portion 46b at the side of the top wall (as shown in FIG. 4), and protrudes toward the front wall 11f to form a radially enlarged portion 46g slightly below the end portion 46b. The second guide groove 47 extends between its end portion 47e at the side of the back wall 11e and its radially extended end portion 47f at the side of the front wall 11f. The first pin 35 can be inserted from the radially enlarged portion 46g into the first guide groove 46 and moved between the end portions 46a and 46b, and the second pin 36 can be inserted from the end portion 47f into the second guide groove 47 and moved between the end portions 47e and 47f.

If the distance between the first pin 35 and the second pin 36 is designated by L1 and if the distance between the first guide groove 46 and the end portion 47e of the second guide groove 47 is designated by L2, the distances are set to satisfy the following relation:

$$L1 > L2.$$

As a result, when the first pin 35 is placed in the end portion 46a or 46b, the second pin 36 is placed in the end portion 47e. When the first pin is moved in the first guide groove 46 from the end portion 46a to the end portion 46b, the second pin 36 once leaves the end portion 47e but returns to the end portion 47e. Thus, the gyro sensor 31 is rocked in the end portion 47e. The second pin 36 is urged toward the end portion 47e by the spring 43 (as shown in FIG. 10) so that the first pin 35 is urged toward the end portion 46a or the end portion 46b.

When the first pin 35 is placed in the end portion 46b of the first guide groove 46 and the second pin 36 is placed in the end portion 47e of the second guide groove 47, as shown in FIG. 1, the gyro sensor 31 can be mounted in the first mounting direction. In this state, the position of a screw regulating hole 51 formed in the side wall 11c and the position of the threaded hole 39 formed in the bracket 34 (shown in FIG. 7) are aligned, and the threaded hole 38 is positioned in the first guide groove 46. By driving fastening screws (not shown) acting as the fixing means into the threaded holes 38 and 39, therefore, the gyro sensor 31 can be fixed in the first mounting direction.

When the first pin 35 is placed in the end portion 46a of the first guide groove 46 and the second pin 36 is placed in the end portion 47e of the second guide groove 47, as shown in FIG. 2, the gyro sensor 31 can be mounted in the second mounting direction. In this state, the position of a screw regulating hole 52 formed in the side wall 11c and the position of the threaded hole 38 formed in the bracket 34 are aligned, and the threaded hole 39 is positioned in the first guide groove 46. By driving the fastening screws into the threaded holes 38 and 39, therefore, the gyro sensor 31 can be fixed in the second mounting direction.

Thus, merely by moving the first pin 35 linearly along the first guide groove 46, the mounting direction of the gyro sensor 31 can be changed between the first and second positions so that the navigation unit can be installed both horizontally and vertically with the gyro sensor 31 being mounted thereon. Unlike the navigation unit of the prior art, the gyro unit having the gyro sensor according to the present invention need neither be manufactured separately of the navigation unit nor be installed directly on the vehicle. As a result, the navigation unit is not enlarged in its occupation area so that its mounting can be simplified. Moreover, neither the case of the gyro unit nor the communications circuit, or the like, between the navigation unit and the gyro unit are needed so that the cost can be lowered. Also, two gyro sensors, i.e. one for each mounting direction, need not be arranged in the casing 11. The cost and size of the unit are, thus, reduced compared to the prior art.

In addition, while the first pin 35 is being moved in the first guide groove 46 from the end portion 46a to the end portion 46b, the second pin 36 once leaves the end portion 47e acting as the rocking center and moves in the second guide groove 47. Thus, it is possible to reduce the space necessary for changing the mounting direction of the gyro sensor 31 between the first mounting direction and the second mounting direction. As a result, it is possible to utilize the space in the casing 11 around the gyro sensor 31 effectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicle navigation unit comprising:

a casing for attachment to a vehicle with one wall member of said casing either vertical or horizontal;

a gyro sensor, having an axis of rotation, for detecting travel direction of the vehicle; and mounting means for rotatably supporting said gyro sensor within said casing for rotation between a first mounting position wherein said axis of rotation is oriented vertically and parallel to said one wall member, with said one wall member vertically oriented, and a second mounting position wherein said axis of rotation is oriented vertically and perpendicular to said one wall member, with said one wall member horizontally oriented.

2. A vehicle navigation unit comprising:

a gyro sensor for detecting travel direction of a vehicle, said gyro sensor having, extending therefrom, first and second pins; and mounting means for mounting said gyro sensor within a casing, said mounting means including a first guide groove in the casing for receiving and guiding said first pin and a second guide groove extending perpendicular to said first guide groove in the casing for receiving and guiding said second pin, and wherein said second guide groove provides a rocking center for said gyro sensor.

3. A vehicle navigation unit according to claim 2:

wherein said casing is attachable to the vehicle with one wall and wherein said mounting means rotatably supports said gyro sensor within said casing for rotation between a first mounting position wherein said axis of rotation is oriented vertically and parallel to said one wall member, with said one wall member vertically oriented, and a second mounting position wherein said axis of rotation is oriented vertically and perpendicular to said one wall member, with said one wall member horizontally oriented.

* * * * *